July 31, 1956 E. W. GOLDBERG 2,756,630
AUTOMATIC SLIDE CHANGER
Filed Jan. 29, 1951 6 Sheets-Sheet 5

INVENTOR.
Ernest W. Goldberg

United States Patent Office 2,756,630
Patented July 31, 1956

2,756,630

AUTOMATIC SLIDE CHANGER

Ernest W. Goldberg, Wilmette, Ill.

Application January 29, 1951, Serial No. 208,402

26 Claims. (Cl. 88—28)

This invention pertains to automatic slide changers for picture projectors, and has as one of its principal objects the provision of an automatic slide-changing mechanism constructed as a unit separate from the projector and adaptable for use with any projector having a slide bed suitable to receive the slide carrier of the improved mechanism.

Another object is the provision of a unitary tray-loading slide-changing mechanism adapted to receive a removable slide magazine in the form of a slide-filing tray, such that the selected magazine, previously or normally loaded with a selection of slides, usually forty, can be easily inserted in the changer, and the changing mechanism can be actuated at will to remove the slides from the tray, one-by-one, transport them into the projector, and return them to their proper positions in the magazine in sequential order until the full selection has been shown.

Other objects are: the provision of an improved slide transporting means, an improved magazine structure coacting therewith; a feeding bed for the magazine, a novel step-by-step advancing mechanism for the magazine; a novel slide-transfer means which is foldable to permit stowage; a repeat operating control for the magazine transport or stepping means, and other features of structural and functional utility and novelty which will appear as the following description proceeds in view of the annexed drawings, in which:

Figure 1:
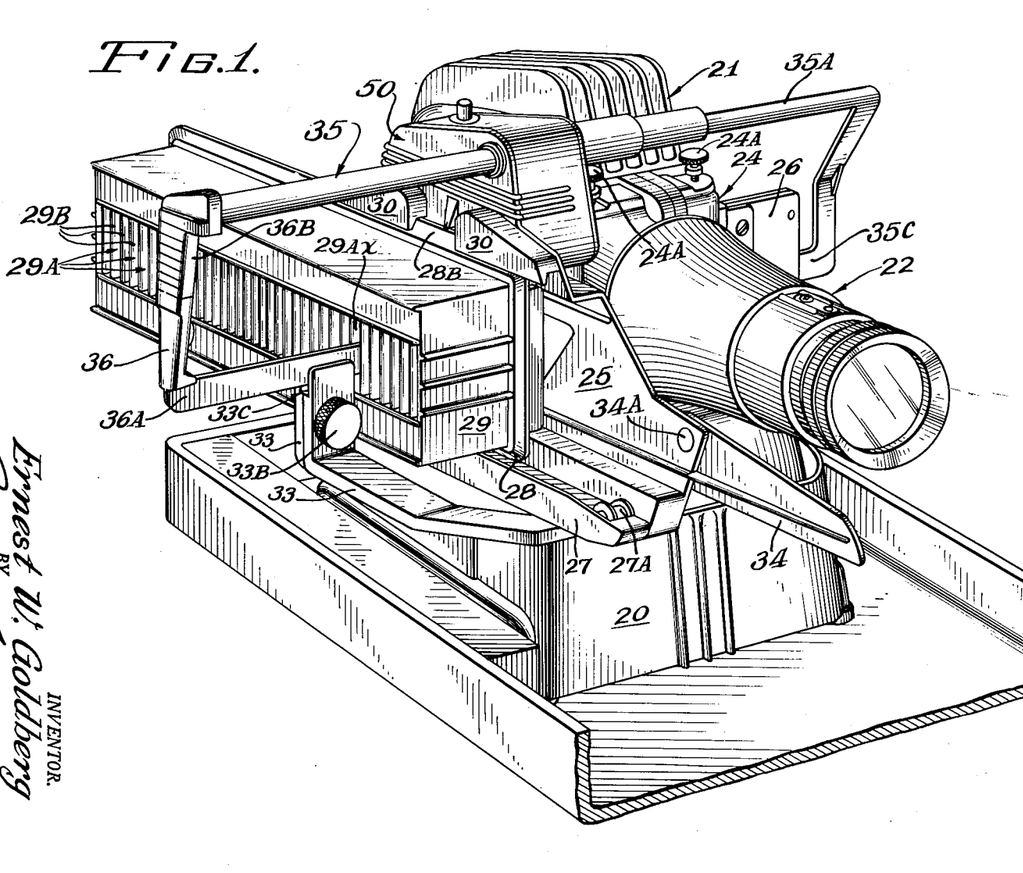
Fig. 1 is a perspective view (with the base tray partly cut away) of a slide projector with the novel slide-changing unit installed thereon, and shown in operative condition.

A conventional slide projector is shown in Fig. 1, and consists essentially of a base 20, a lamp housing 21, and a lens assembly generally indicated at 22. As seen better in Fig. 4, the lamp house and lens assembly may be tilted about a horizontal axis through trunnion bolts 23.

The projector has a narrow transverse opening at 24 (Fig. 1) which is adapted to receive conventional slide holders (not shown), such holders commonly being capable of holding only one or two slides which are manually shifted back and forth in alignment with the lens system by means of a reciprocable slide carrier (not shown).

Generally, as depicted in Fig. 1, the novel automatic slide-changing mechanism, which is the subject of this disclosure, includes a T-shaped unit consisting of a magazine bed 25 extending along the side of the machine, and having at right angles thereto a slide frame 26 removably supported in said transverse opening 24 which ordinarily would receive the old style slide holder. The changer unit may be clamped in the holder bed by turning home the set screws 24A.

Along the bottom edge of the magazine bed 25 is a long bottom track section 27 in which are grooved rollers 27A to receive the bottom edge flange 28A of a magazine tray 29.

Figure 5:
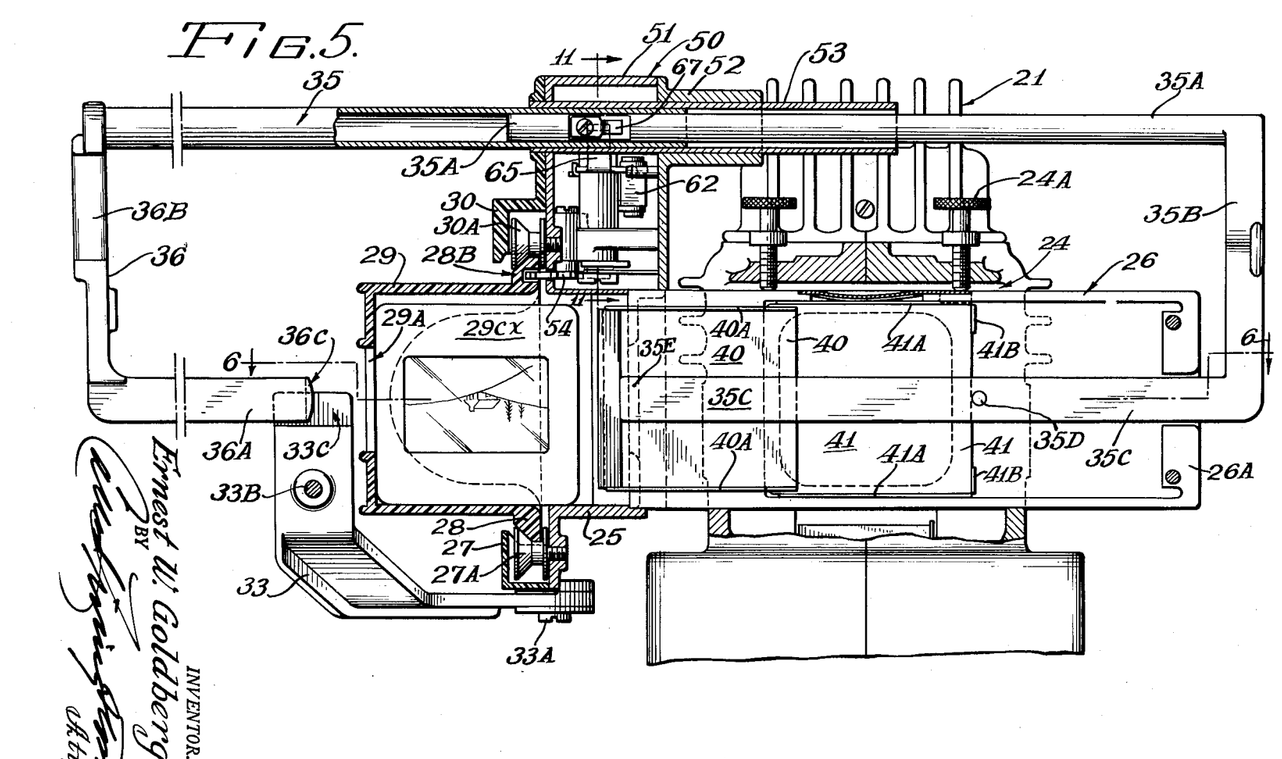
Fig. 5 is a front cross-sectional view taken through the slide-changing unit along lines 5—5 of Fig. 2, showing a slide prior to transfer from the magazine tray.

The upper edge flange 28B of the magazine is similarly received and guided in a pair of upper, short track sections 30, each provided with grooved rollers 30A, as seen to advantage in Fig. 5.

Figure 6:
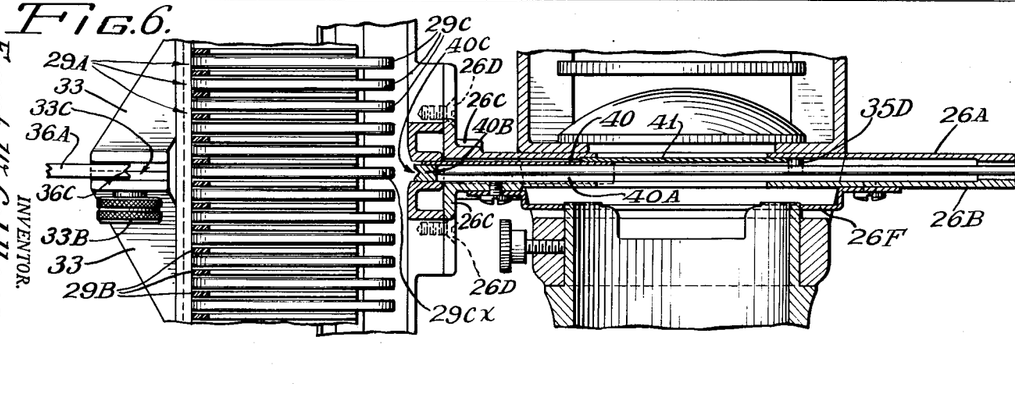
Fig. 6 is a fragmentary horizontal section through part of the magazine, slide transport bed and projector, as viewed along lines 6—6 of Fig. 5.

In the magazine tray 29 (Figs. 1 and 6) are a series of slide compartments or pockets 29A defined by shallow, integral ribs 29B, said pockets being open along the bottom of the tray and, of course, at the top of the tray, it being noted that this tray is shown lying on its side in the bed. In Fig. 6 the magazine is shown to be loaded with a series of slides 29C.

Figure 4:
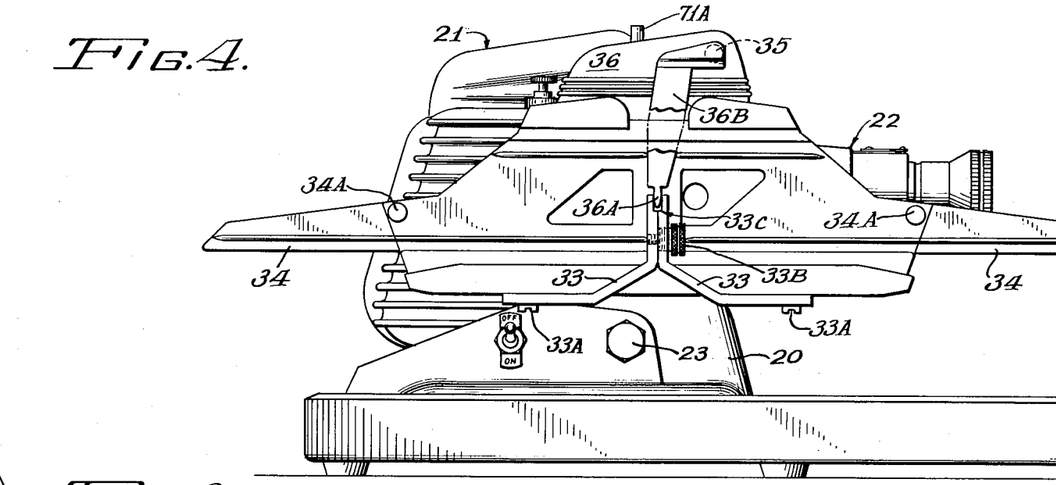
Fig. 4 is a side elevation (to reduced scale) of the device of Figs. 1 and 2 with the slide magazine removed, to show the magazine bed.

A pair of outrigger guide arms 33 (Figs. 1 and 4) are pivotally attached, as at 33A (Figs. 4 and 5) on the bottom edge of the magazine bed, and when swung out and into operative position, as in Figs. 1 and 4, they are secured together by means of a set screw 33B, the confronting faces at the top of these swinging guide arms being relieved to define a guide groove 33C, as in Figs. 1 and 6, to receive and guide the lower short transfer arm 36A of a reciprocable slide transferring bar 35.

Figures 2, 14:
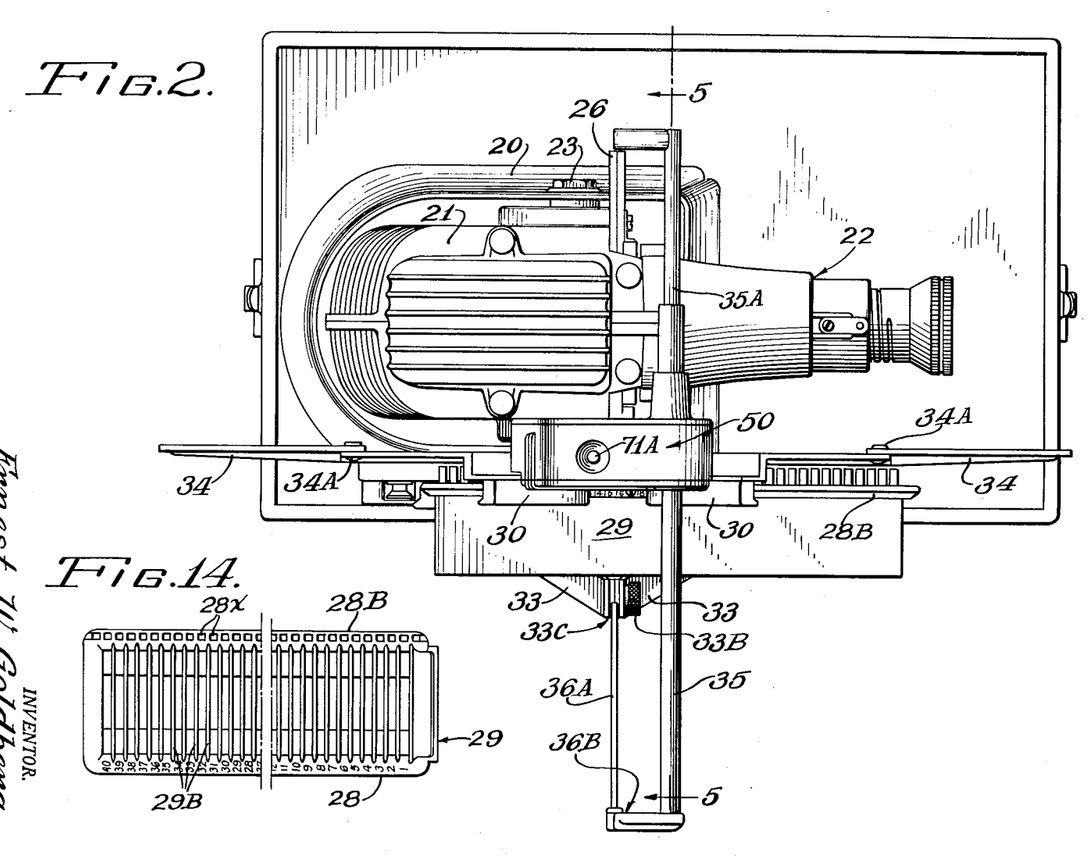
Fig. 2 is a top plan view (to reduced scale) of the device of Fig. 1.
Fig. 14 is a broken top plan view of the novel magazine tray showing flanges and gear rack therein.
Figure 3:
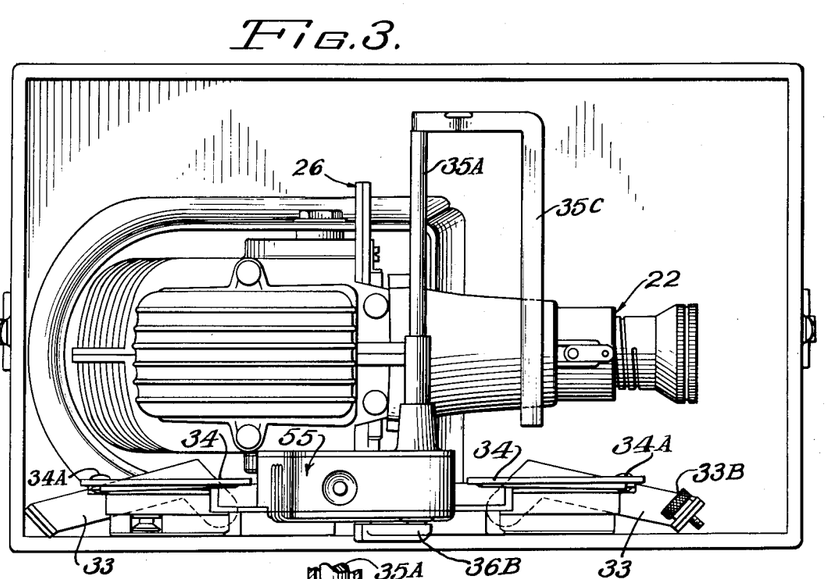
Fig. 3 is a top plan view like that of Fig. 2, but showing the slide magazine removed and the slide-changing mechanism folded into inoperative, stowing condition for reception in its carrying case.

Another pair of folding outrigger magazine guide arms 34 appears in Fig. 4, these arms being situated at the opposite ends of the magazine bed, the same being shown to advantage also in Figs. 1 and 2, while in Fig. 3 both pairs of outrigger guide arms 33 and 34 are shown folded into stowing condition.

Referring to Fig. 5, the slide transfer means includes the main tubular arm 35 into which telescopes an extension arm 35A having a depending leg 35B from the bottom of which projects a reentrant slide return arm 35C, reciprocable, as will hereinafter appear, in the slide frame.

At the lefthand side of the slide transfer bar assembly is another depending leg 36, from which projects in a reentrant sense the slide transfer arm 36A heretofore mentioned as being guided in the outrigger guiding groove 33C. The section 36 of the transfer bar is the handle portion and includes a short pivoted finger grip 36B, which may be grasped in reciprocating the transfer bar.

At this juncture, referring especially to Figs. 1 and 5, it will be now understood that the entire slide transfer bar assembly generally indicated at 35 (and including parts 35A, 35C, 36, 36A) may be reciprocated, causing the transfer arm 36A to enter one of the compartments 29A in the slide magazine and push the slide into the slide frame 26, into projecting position; or if the slide is already in such position, then causing the slide return arm 35C to push the slide back into its compartment in the magazine.

The construction of the slide frame 26, as shown in Fig. 6, consists in a pair of mating die-cast plates 26A, 26B, each having a pair of offset feet 26C (see also Fig. 10) adapted to fit flush against the side of the magazine bed casting, to which the feet are secured as by screws 26D, the two plates being further joined at their outer (righthand ends) by other screws (Fig. 9) 26E.

On the outer face of the forward plate 26B is a third plate 26F removably attached by screws, the purpose of this plate being that of an adaptor merely to add thickness to the main frame to adapt it to certain projectors having wider slide carrier beds.

The inner faces of the plates 26A, 26B are relieved to afford a cavity in which a slide plate 40 (Fig. 5) and a shutter plate 41 may travel back and forth. The pair of plates 40 and 41 constitute a shutter means operable in one direction by an entering slide, and in the opposite direction by the transfer arm, as will appear.

Figure 7:
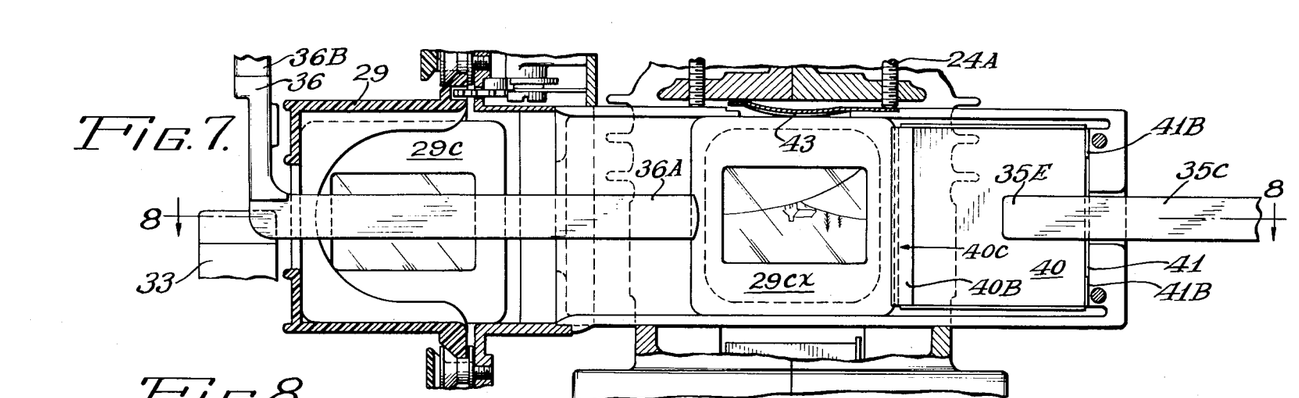
Fig. 7 is a fragmentary vertical section through the magazine tray and transport bed similar to that of Fig. 5, but showing a slide displaced into projecting position.
Figures 8, 9, 10:
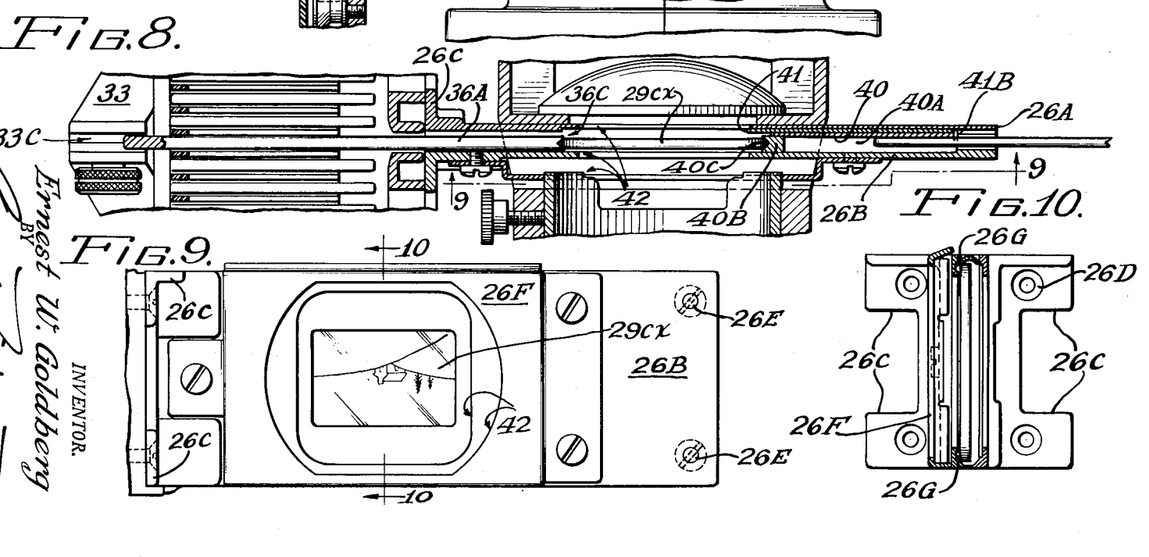
Fig. 8 is a fragmentary horizontal section through part of the magazine and transfer bed as viewed along lines 8—8 of Fig. 7.
Fig. 9 is a fragmentary front elevational detail of the projection station in the slide bed, taken along lines 9—9 of Fig. 8.
Fig. 10 is a cross-sectional detail of the slide transfer bed, taken along lines 10—10 of Fig. 9.

Plate 40 has opposite edges offset to provide track flanges 40A, while the shutter plate has similar flanges 41A, but the latter are somewhat farther apart than flanges 40A, so that the slide plate can telescope or nest in between flanges 41A, in the manner shown at the right of Figs. 7 and 8.

The front frame plate 26B has a pair of longitudinal track grooves 26G (Fig. 10) along the top and bottom edges thereof in which both sets of track flanges (whether nested or not) may ride in the reciprocable movement of the two plates.

As seen in Figs. 7 and 8, the slide plate 40 has a vertical bar 40B at its lefthand margin, and there is a vertical V-shaped groove in the lefthand face of this bar (Fig. 8) which is adapted to receive the leading edge of a slide, as at 40C in Fig. 8, it being observed also in Fig. 6 that this groove 40C is in juxtaposition with the slide edge when the slide plate is in its left-most position just prior to advance (toward the right) of the transfer arm 36A, the latter having a V-shaped groove 36C which engages the trailing edge of a slide upon advance of the transfer arm (see Fig. 7 for advanced position).

The shutter plate 41 at its righthand edge has upper and lower offset ears 41B which are engaged by the leading (right-hand) vertical edge of the slide plate 40 when the latter is advanced or shifted fully to the right, as in Fig. 8, and these ears act as stops for advancing movement of the slide plate, and also serve as a coupling means between plate 40 and 41 upon return (leftward) movement, when the transfer restoring arm 35C moves back toward the left.

Said transfer restoring or returning arm 35C, as in Fig. 5, has a small stud 35D situated to engage the righthand (leading) edge of the shutter plate 41 upon restorative movement of arm 35C toward the left, thereby carrying the shutter plate 41 with it, and the shutter plate in this motion becomes coupled by ears 41B to the slide plate 40, as in Fig. 8, so that both plates will be shifted back toward the left in returning the slide to the magazine.

Both of the slide frame plates 26A, 26B, as well as the adaptor plate 26F, have aligned windows, as at 42 (Figs. 7 to 9), which are in alignment with the lens means 22; and a spring presser 43 (Fig. 7) is provided centrally on the top of the slide frame to hold the slide 29CX firmly in projecting position before these windows.

Means for automatically advancing the magazine tray 29 dependently upon reciprocation of the transfer arm assembly 35, 35A, etc., is indicated generally at 50 (Fig. 1), and, as shown in detail in Fig. 5, this means includes a small metal housing 51 which is an integral part of the magazine bed casting, and has an integral outer sleeve 52 in which is force fitted an inner bearing sleeve 53 affording a sliding or telescoping support for the transfer arm 35, so that the latter may be said to reciprocate through said housing along with the companion arm 35A, which also telescopes in the bore of the main tubular arm 35, as heretofore pointed out, for holding and showing purposes.

Figures 11, 12, 13:
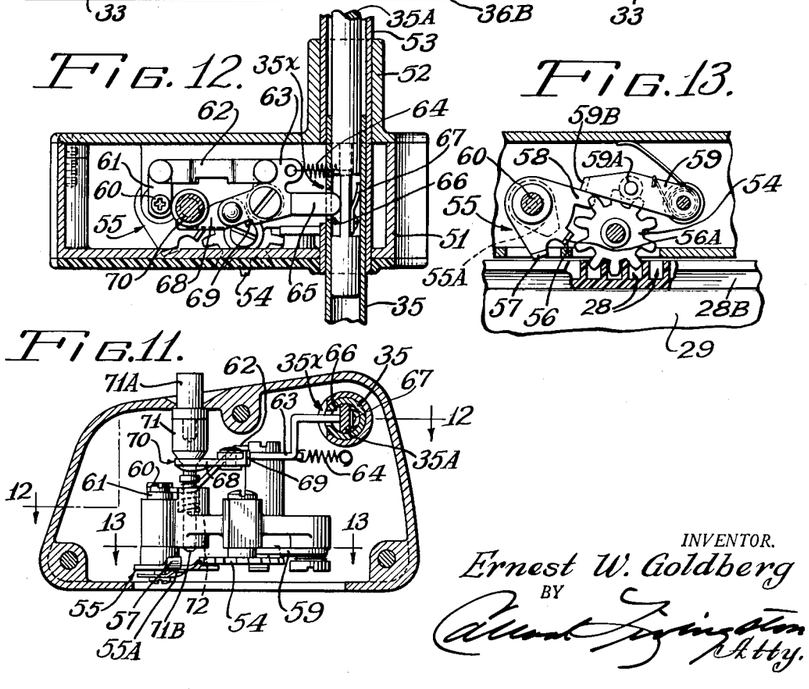
Fig. 11 is a vertical sectional detail through the magazine-stepping or transport mechanism housing, showing parts of the stepping mechanism in elevation, the view being taken along lines 11—11 of Fig. 5.
Fig. 12 is a horizontal sectional detail taken along lines 12—12 of Fig. 11 showing parts of the stepping mechanism in plan.
Fig. 13 is a horizontal sectional detail of the magazine advancing drive mechanism and pinion looking down along lines 13—13 of Fig. 11.

In the top plan view of the magazine shown in Fig. 14, the flange 28B is provided with a series of gear teeth 28X each opposite one of the slide compartments, and as seen in the detail of Fig. 13, these teeth are engaged by the teeth of an advancing pinion 54 pivoted in the housing 51.

Means for advancing the magazine pinion 54, step-by-step, includes a unidirectional pawl 55 (Fig. 13) having an advancing tooth 56 engageable in the teeth of pinion 54, and a stop tooth 57 likewise engageable behind the succeeding tooth of said pinion to stop or limit the pawl.

A spring-urged stop pawl 59 has a roller 59A adapted to press in between succeeding teeth on pinion 54 to register the same in each advance of one tooth and thereby properly register the magazine 29 with the slide frame 26.

As viewed in Fig. 13, the advancing pawl also has a third tooth 58 to engage the offset nose 59B of the stopping pawl and pivot the latter and its roller out of the pinion teeth during advances of the pinion until such time as the tooth 58 slips past the pawl end 59B to allow the pawl 59 to be snapped back by its spring to stop the pinion 54 at an exact position.

The advancing pawl 55 (Figs. 11 and 12) is fast on a stud shaft or pivot 60, having a short crank arm 61 fast thereon, and this crank in turn is pivotally connected by an offset link 62, to a driving pawl 63, normalized by a spring 64, and having a feeler projection 65 entering a slot 35X in the tubular transfer arm 35 so as to engage in a notch 66 in the arm 35A.

A pawl 68 is pivoted on the driving pawl and has an upset stop lug 69 to engage the latter for stop purposes on the return stroke of the feeler projection 65. Pawl 68 also has a curved and cammed end portion 70 (Fig. 12) engageable with the conical underside of a repeat or idling button 71, normalized in upwardly elevated condition by a spring 72. When the button (and its removable top section 71A) is depressed, the end 70 of pawl 68 is cammed slightly by the conical portion of button 71 so as to turn the driving pawl 63 slightly counterclockwise (Fig. 12) for the purpose of easing the feeler 65.

The lower extremity 71B of the idling button has the function of bearing down upon the advancing pawl 55 to depress the latter against its radial leaf spring 55A (Figs. 11 and 13) so that its tooth 56 cannot engage in the advancing pinion on the driving stroke.

Thus, by depressing the repeat or idling button the slide transfer arm may be reciprocated at will to move the identical slide back and forth, into and out of projecting position as many times as desired, without moving the magazine.

On its back or return movement the advancing pawl tooth 56 may yield and pass beneath the pinion 54 by reason of a cam edge 56A on the trailing side (Fig. 13) thereof, the leaf spring 55A permitting the pawl to be depressed in this manner, as well as by the idling button.

*Summary of operation*

Assuming that the projector is to be removed from the stowing condition of Fig. 3 and readied for operation, the transfer arm 35C is withdrawn in tube 35A to the limit determined by stop spring 67 (Figs. 11 and 12) engaging a margin of the slot 35X, and the lower reentrant arm portion 35C is turned down in register with the end opening in the slide frame 26 for entry into the latter.

Next, the finger grip 36B may be grasped to pull the transfer arm 35 into retracted position (downwardly in Fig. 3, or to the left, to the position shown in Fig. 1).

Following this, the two outrigger guide arms 33 are turned into position and secured by set screw 33B; and thereafter the other pair of outrigger guide arms 34 are turned down.

Assuming the projector is connected to power in readiness for operation, a loaded magazine tray 29 is turned on its side and its flanges 28 and 28B slid into the track means 27, 30.

Looking down upon the projector in Fig. 2, it is merely necessary to move the transfer bar back and forth to effect the showing of slides one after another. As seen in Fig. 2, the magazine is depicted in an advanced position, which presumes that possibly the first twenty or so slides have been displayed; however, it is important to note that the magazine may be moved manually to any desired position at will if the idling button 71A is held down and the transfer bar held fully withdrawn, meaning to the left, as in Fig. 5. It should also be noted that the magazine 29 may always be backed up manually any distance without use of the idling button, as when it is desired to go back and display some previously shown slide.

The condition of the advancing arm portion 36A just prior to movement of a slide toward projecting position is shown in Fig. 5; and at the beginning of the transfer stroke, the grooved end 36C of the slide-advancing arm enters the bottom opening 29AX of the magazine, as depicted in Fig. 1.

As the aforesaid advancing stroke continues, the slide 29CX to be displayed will first bear onto the slide plate groove 40C in plate bar 40B, whereupon the plate 40 will be shifted toward the right from the position of Fig. 6 ultimately into the positions of Figs. 7 and 8, wherein the slide 29CX is held beneath the presser spring 43 in alignment with the optical axis of the projection lens means.

At the beginning of the aforesaid transfer stroke, it will be noted in Figs. 5 and 6 that the shutter plate 41 is shifted fully toward the left to block light from the lamp means through the lens means in order that the projection screen may be kept in complete darkness between changes of slide.

Thus, the shutter plate 41 (Fig. 5) will not begin to open (to the right) until plate 40 is nested into plate 41 and strikes ears 41B, at which time the slide 29CX will be in the position therefore occupied by plate 40 and will thereafter move into projecting position concurrently with the movement of the shutter plate 41 toward ineffective position, at the right of Fig. 8.

During the foregoing slide-advancing travel of the transfer arm 35, etc., the feeler pawl 65 of the automatic magazine advancing mechanism will simply turn counterclockwise out of notch 35X (Fig. 12) and ride idly on the side of tube 35.

When it is desired to return the slide 29CX to the magazine and show the next slide the transfer means is returned leftward from the position of Fig. 7 until the free end 35E of the return arm 35C strikes the bar 40B on shutter plate 40, thus pushing the latter, and hence the slide 29CX, back toward the magazine.

During the latter operation, the stud 35D on return arm 35C will engage the leading edge of the shutter plate 41, as in Fig. 5, and close the shutter as the slide moves back toward and into the magazine compartment from which it was transferred or advanced.

Thus, the double, overlapping or nesting shutter plates follow the retreating or departing slide to provide a fade-out, and likewise retreat ahead of the entering slide to provide the reverse action.

As the main transfer bar or tube 35 approaches the end of its retractive stroke in the foregoing slide-restoring or returning operation, the notch 35X will again pass into alignment with the nose of the feeler pawl 65 to catch the latter and pivot the pawl slightly clockwise (Fig. 12), at about the moment arm 35 reaches the end of its return stroke; but no advancing action occurs until the transfer arm 35 is once again started in advancing travel, and the feeler pawl 65 is again thereby pivoted slightly counterclockwise so as to pivot the advancing pawl 55 through link means 61, 62, thereby advancing the pinion 54 a distance of one tooth, and consequently moving the slide magazine forward the distance of one slide compartment.

The magazine will be advanced to the next position, as aforesaid, well before the nose 36C of the advancing arm enters the bottom opening 29A in the now newly aligned slide compartment, so quick is the action of the magazine-advancing means.

The remainder of this stroke of the transfer frame or means 35, 36, etc., will be a repetition of the cycle heretofore described in moving the new slide into projecting position, and restoring the same to its proper magazine compartment upon the return stroke.

It will now be apparent that the disclosure affords a relatively simple, light-weight slide-changing mechanism of the magazine feed type, and a simple automatic magazine advancing means, all contrived as a compact unit which may be supplied as a removable part of original projector equipment, or which may be sold separately as an accessory. And it will be further noted importantly that the construction of the improved slide-changing means permits a partial dismantling and folding which makes possible stowing the projector in its own carrying case, usually supplied with the projector as part of the original equipment.

Slide-changing devices have been known heretofore, but they have been generally cumbersome, costly, complicated to service and operate, and for the most part suited only to professional and permanent installation.

The novel slide-changing unit herein described is entirely portable alone, and its simple installation on any of a variety of projectors does not affect the complete portability of such projectors.

I claim:

1. In an automatic slide changer a magazine bed having upper and lower roller tracks, a magazine tray having opposite track flanges to slide in said tracks, and gear teeth extending along one of said flanges together with open bottom wall portions beneath each slide to be contained in the tray, a housing at the top of the bed, a transfer arm reciprocable transversely of said bed through said housing, a slide bed extending from a side of the magazine bed adjacent said arm, a pinion on said bed engageable in the magazine teeth, pawl and link means in said housing for stepping said pinion to advance the magazine step-by-step, and feeler means co-acting with said pawl and link mechanism and engageable with said transfer arm for movement thereby responsive to each reciprocation thereof for stepping said pinion, and means movable by said arm during each reciprocation thereof to enter said magazine, transfer a slide therefrom into said slide bed, and to restore said slide to the magazine.

2. A structure according to claim 1 in which said transfer arm includes a main tubular portion and a telescoping portion therein extendable to full operating position for slide transfer and restoration as aforesaid, and foldable into the main tubular portion for purposes of stowage.

3. Apparatus in accordance with claim 1 in which said pawl and link mechanism includes an idling button operable to disable the same against stepping of said pinion during reciprocation of said transfer arm to prevent advance of the magazine.

4. Apparatus in accordance with claim 1 in which said magazine bed includes a pair of pivoted outrigger arms movable from a folded condition for stowage to an operative position to define a guide for a part of said transfer arm.

5. Apparatus in accordance with claim 1 in which said slide bed includes a shutter plate and a slide plate nesting therewith and reciprocably slideable in the bed, said slide plate being engaged and moved by a slide transferred into the bed as aforesaid into nesting relation with the shutter plate, said shutter plate being moved by slide return motion of the transfer arm to move the slide plate and position the slide ahead of it back into the magazine and dispose said shutter in a predetermined light-blocking position.

6. In a slide changing mechanism, a foldable slide transfer arm structure including at least two relatively slidable arm members, one of which is slidably carried by the other, such that the same are relatively extensible to a predetermined operating length, and foldable to a predetermined and lesser stowage length, each of said arms having a pendant portion with a return projection extending toward the other, the opposing ends of said projections being spaced apart a predetermined distance in extended condition of said structure to flank a slide of predetermined width.

7. For a slide changing mechanism, a foldable slide transfer device including at least two elongated arms, one of which is supported by telescoping interfit with the other for relative lengthwise sliding movement whereby said arms may be extended from a minimum folded stowing condition to a predetermined extended operating condition, one of said arms being rotatively movable relative to the other, each arm having a reentrant slide transfer extension terminating in a predetermined spaced relation to the terminus of the other in extended operating condition, said reentrant extensions also being axially alignable by turning one arm relative to the other.

8. In a slide changing mechanism, an elongated slide-receiving frame adapted to fit into a projector, having openings into opposite ends thereof, one of which constitutes an endwise slide-opening into said frame, a projecting station in said frame including a window through said frame, a main transfer arm and means mounting the same above said frame for reciprocal sliding motion lengthwise of the frame, a second transfer arm and means on the main arm affording support for said second arm such that the latter is slidable colinearly of the main arm for extension from a folded stowing condition of least length to an extended operating condition of predetermined greater length, a reentrant slide-return pusher arm carried by the second arm and adapted to enter the end of said frame opposite from said slide-opening for pushing a slide in a return direction, said main arm having a reentrant transfer arm adapted to enter said slide opening to push a slide into the frame, said main and second arms in extended condition being jointly reciprocable to effect movement of the slide into and out of said frame in any single reciprocation thereof.

9. In a slide changer, of the type including a magazine bed for a slide tray having a gear rack thereon, together with a reciprocable slide transfer arm for moving slides into and out of the tray responsive to each reciprocation of said arm, improvements comprising, to wit: magazine moving means including a stepping pinion and means mounting hte same adjacent the bed to mesh with the gear rack on a tray as aforesaid, a feeler lever oscillated by said transfer arm once for each reciprocation of the arm, a unidirectional stepping pawl and driving means actuated by said feeler lever by each oscillation of the latter to advance the magazine tray a predetermined amount in said bed responsive to each reciprocation of said transfer arm.

10. Mechanism as defined in claim 9 further characterized by the provision therein of an idling control including a member selectively movable to disengage said stepping pawl from cooperative relation with said feeler lever mechanism, whereby the transfer arm may be reciprocated without effecting movement of the magazine in said bed.

11. In a slide changer, the combination with a slide frame receiving slides by entrance therein in one direction and from which the slides are removed by motion in the reverse direction, of improvements comprising, to wit: a slide transfer arm and means mounting the same in juxtaposition with said slide frame to reciprocate in parallelism with the plane of the slide frame, a pendant slide transfer projection at one end of said arm, and a pendant slide return projection at the opposite end of said arm, said projections respectively adapted to enter opposite end regions of said frame responsive to reciprocation of said transfer arm, a slide entrance at one end of said frame adjacent said transfer projection and adapted to receive a slide pushed by the latter responsive to inward transfer movement thereof, an opening at the remote side of said frame from said entrance and adapted to admit said return projection, a slide projection window situated in the frame between said entrance and remote side, and shutter means actuated by said arm and including a pair of shutter plates slidable in the body of said frame and moved into and out of blocking position relative to said window responsive to movements of a slide into and out of position before the window by reciprocating movements of the transfer arm, said plates retreating from before the window ahead of a slide entering the frame and engaging one of the plates, and following the slide into blocking position under urgence of the other plate by means on said return projection as the slide retreats in leaving the window.

12. The combination of claim 11 further characterized in that said shutter plates are slidably interfitting and movable into relatively overlapping relation in non-blocking position at one side of said window adjacent the remote side of the frame, together with means on said plates for coupling the same in interfitted condition for joint sliding movement in one direction responsive to pushing of one of the plates by a slide entering the frame, and for coupling said plates in the opposite direction responsive to pushing of the other plate by said return projection in return action of the transfer arm, whereby said shutter plates follow a departing slide in its retreat from before the window, and said plates retreat before the entering slide as it advances into position before the window.

13. In a slide changing mechanism for projectors, a slide frame adapted to fit into the slide bed of a projector, a magazine bed joined to said slide frame, vertically spaced upper and lower grooved wheels mounted on said magazine bed, and a slide magazine of elongated form having opposite parallel marginal flanges shaped to fit into the grooving in said wheels for support and travel of the magazine lengthwise on said wheels, said magazine further having slide pockets spaced along its length and opening laterally thereof between said flanges, said slide frame having a slide entrance confronting said pockets, said magazine being adapted for travel as aforesaid to position the opening of any of said pockets in register with said slide entrance.

14. In a slide changing mechanism for projectors having a slide bed: an elongated slide frame receivable in said slide bed; means defining a chamber as a part of said slide frame; means defining a bore communicating with said chamber and extending in the direction of said frame and bed; an elongated slide transfer-arm structure slidably seated in said bore to reciprocate therein in the direction of length of said slide frame; a unidirectional magazine-driving mechanism housed in said chamber and including a magazine-engaging and driving member moved thereby; operating means for said driving mechanism and including a member extending into said bore for driving engagement with said slide transfer-arm structure for operative movement responsive to reciprocating movements of said slide transfer-arm structure to actuate said driving mechanism; means defining a magazine bed joined to said slide frame, said magazine-driving member being situated adjacent said magazine bed to drivingly engage a magazine therein and move said magazine responsive to actuation of the driving mechanism as aforesaid.

15. The construction of claim 14 further characterized in that said slide transfer-arm structure includes a first elongated arm slidable in said bore, and a second elongated arm slidably supported by said first arm for extensive and retractive movement to define a collapsible arm structure for stowage purposes, one of said arms having a slide-engaging offset adapted to enter a magazine in said magazine bed to move a slide into said slide frame in one direction of sliding movement of said slide transfer-arm structure; and the other said arm having an offset projection adapted to enter said slide frame to expel a slide therefrom in the reverse sliding movement of said slide transfer-arm structure.

16. In a slide-changing mechanism: a slide frame of elongated, flat configuration adapted to fit into the slide bed of a projector; an elongated slide chamber defined within said frame, the latter having a projection window near its mid-region before which a slide is to be moved and removed; said frame further having a slide entrance at one of its longitudinal margins; a reciprocable slide restoring arm movable through the opposite longitudinal margin of said frame into said chamber and of a length to substantially extend to said slide entrance when fully entered into the chamber; a pair of plates slidable in said chamber in parallelism with each other and the plane of a slide received therein, said plates being mounted to slide into and out of overlapping juxtaposition and being of a length relative to the length of said chamber to span the distance from said slide entrance to the margin of said window remote from said entrance when the plates are relatively extended, said plates further being each of a width substantially the same as the width of a slide and slightly greater than the width of said window, all measured lengthwise of said frame; whereby a slide entering the frame will engage a first one of said plates in their relatively extended condition and push the same into overlapping relation to the other said plate before said window; means for coupling said plates in overlapping relation for joint movement to an inactive position in a direction away from said slide entrance at one side of said window; said slide-restoring arm acting in movement toward said slide entrance to move both of said coupled plates from inactive position to blocking position before said window, and thereafter continuing to move only one of the plates from said blocking position to said slide entrance, whereby to block said window and expel a slide from said entrance.

17. In a slide-changing mechanism, a slide-receiving frame including a shallow elongated slide chamber having a projection window about midway between its two longitudinal margins, with a slide entrance at one of said margins, and a reciprocable slide-ejector moving lengthwise of the chamber from the opposite margin; a slide pusher coreciprocable with said ejector and aligned with said entrance to push a slide into the same fully before said window; said ejector retreating from said entrance as a slide is pushed into the chamber as aforesaid; and shutter means including a pair of plates slidable in said chamber from relatively overlapping juxtaposition before said window to a relatively extended relation spanning the distance between said slide entrance to the remote margin of said window; said plates being further movable in overlapped relation from a position before said window to a non-blocking position beyond said remote margin therein; means coupling said plates in said overlapping relation for joint movement from a position before said window to said non-blocking position; means coupling said ejector with said plates in non-blocking position to move both plates progressively before said window, and thereafter move a particular one of said plates beyond the window substantially to said slide entrance; a slide which is moved as aforesaid by said pusher through said entrance to projecting position before said window, acting to move said particular plate ahead of it into said overlapping and coupled relation with the other plate, and continuing to move the coupled plates to said non-blocking position, whereby said window is opened and closed coresponsive to the entrance and ejection of slides into and out of projecting position by said pusher and ejector as aforesaid.

18. In a slide changing mechanism for projectors of the type including a magazine bed for a slide magazine and a slide bed projecting laterally from said magazine bed, improvements comprising, namely: means providing upper and lower guide tracks extending in parallism alongside said magazine bed, an elongated slide-magazine box having an open side along its length and a pair of longitudinally-extensive flanges bordering said side and respectively adapted to be received in said guide tracks for guided support of the magazine along said magazine bed; said flanges being of approximately triangular cross-section with a sloping flat face extending between the adjoining outer margin of the appertaining flange and the adjoining side of the magazine box, slide compartments in said box arranged serially lengthwise thereof; and indicia on the sloping face of at least one of said flanges and aligned with each said compartment to identify the latter and a slide therein, and grooved means in said tracks formed to interfit with the shape of said flanges and support the latter for longitudinal travel of the magazine box along said guide tracks.

19. The structure defined in claim 18 further characterized by the provision in at least one of said flanges of a longitudinally-extensive series of gear teeth, and pinion means on said changing mechanism situated adjacent said guide tracks to mesh with said gear teeth; means for actuating said pinion means to move the magazine; whereby said magazine box is movable to selectively register any of said compartments with said slide bed.

20. In a slide changer for projectors of the type having a magazine bed including upper and lower parallel magazine track means and magazine-advancing pinion means adjacent thereto; the combination of an elongated mgaazine tray having an open top along its length and flanked by parallel side flanges each respectively fitting into one of said upper and lower tracks by turning the tray on its side, one of said flanges having gear teeth formed therein and extending serially lengthwise therealong and operatively engaged by said pinion means.

21. For a slide changing mechanism of the type having pinion means for advancing a magazine, a slide magazine in the form of an elongated box having slide compartments therein and an open top flanked by integrally-formed side walls, an integral flange bordering each longitudinal side wall of the box at said open top and gear teeth formed along the length of at least one of said flanges, said teeth being adapted to cooperate with said pinion means for movement by the latter of said magazine.

22. A slide magazine for use in slide changers of the type including a magazine-advancing mechanism, said magazine comprising, to wit: an elongated box completely open along one longitudinal side said open side being flanked by a pair of opposite longitudinally-extensive side walls, ribs spaced lengthwise along the interior of said box to define slide compartments, said ribs extending between and being integrally joined with said opposite side walls, a pair of integral longitudinal flanges each bordering said open side along the adjoining top of the appertaining side wall, at least one of said flanges having a series of integral advancing formations spaced therealong and adapted to cooperate with a magazine-advancing mechanism in a slide changer as aforesaid.

23. Improvements in a slide magazine for use in a slide changer of the type which includes means for advancing the magazine through the agency of a gear rack and advancing mechanism cooperable therewith to move the magazine step-by-step, said magazine improvements comprising, to wit: a box having a plurality of serially arranged slide compartments therein and an open side communicating into said compartments, together with an integrally formed flange extending along at least one margin of said open side in parallelism with the direction in which the series of compartments extends, said flange having formed as an integral part thereof a series of indented formations extending in said last-mentioned direction and adapted for cooperation with a magazine-advancing member engageable therein.

24. In a magazine type slide tray for use with automatic slide changers having a magazine bed and magazine-advancing mechanism, an improved tray structure comprising, to wit: an elongated box having an open top along its length with opposite side walls adjoining said top and a pair of integrally-formed flanges, one on each side wall of the box adjoining said top, as aforesaid, at least one of said flanges having formed as an integral part thereof a series of sprocket formations extending uniformly along the length thereof, said flanges being adapted to seat in a magazine bed track to support the tray for travel in the direction of its length, said sprocket formations being adapted to cooperate with a magazine-advancing mechanism having an advancing member engageable therein.

25. In a slide changer, a magazine bed, a magazine advancing pinion mounted adjacent said bed; a slide-moving arm structure mounted for reciprocation crosswise of said bed for cooperation with a magazine box disposed in the latter; mechanism coacting with said pinion and said arm structure in reciprocatory action of the latter to move the pinion one tooth per reciprocation of the arm structure; an elongated magazine box having an open top and adapted to rest on one of its long sides in said bed, and also having a series of slide compartments therein with an opening in the bottom thereof opposite each compartment, said box having an integral gear rack extending along at least one lengthwise margin of said open top on a certain long side of the box, said gear rack being juxtaposed in driving engagement with said pinion when the box is turned on said certain one of its long sides in the bed as aforesaid, said slide-arm structure having a pusher portion adapted to enter said bottom openings in the box to push a slide out of the appertaining compartment when the arm structure is moved in one direction, and another pusher portion movable reversely in the opposite direction of travel of said arm structure to provide reverse pushing action for return of a slide to said compartment, the advance of said pinion by operation of said actuating mechanism and arm structure being timed to occur immediately prior to the entry of said first pusher portion into any bottom opening as aforesaid, and means in said bed for supporting said box with the gear-rack flange in cooperative juxtaposition to the pinion as aforesaid.

26. Apparatus according to claim 25 in which said slide arm structure includes elongated telescoping members each having one of said pusher portions attached thereto, whereby said arm structure is rendered foldable for stowage purposes, and extensible from folded condition to an operative condition.

References Cited in the file of this patent

UNITED STATES PATENTS

| | | |
|---|---|---|
| 998,305 | Roebuck | July 18, 1911 |
| 1,159,681 | Kastner | Nov. 9, 1915 |
| 1,402,791 | Petherick | Jan. 10, 1922 |
| 2,427,164 | Stechbart | Sept. 9, 1947 |
| 2,460,359 | Page | Feb. 1, 1949 |
| 2,590,492 | Bennett et al. | Mar. 25, 1952 |